United States Patent
Yamada et al.

(10) Patent No.: US 10,349,347 B2
(45) Date of Patent: Jul. 9, 2019

(54) COMMUNICATION TERMINAL, COMMUNICATION SYSTEM, COMMUNICATION METHOD, AND COMMUNICATION PROGRAM

(71) Applicant: NEC CORPORATION, Tokyo (JP)

(72) Inventors: Toru Yamada, Tokyo (JP); Akira Kamei, Tokyo (JP); Masahiro Serizawa, Tokyo (JP); Hotaka Sugano, Tokyo (JP); Satoshi Hasegawa, Tokyo (JP); Masashi Shimoma, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/559,881

(22) PCT Filed: Mar. 18, 2016

(86) PCT No.: PCT/JP2016/058791
§ 371 (c)(1),
(2) Date: Sep. 20, 2017

(87) PCT Pub. No.: WO2016/152805
PCT Pub. Date: Sep. 29, 2016

(65) Prior Publication Data
US 2018/0063780 A1 Mar. 1, 2018

(30) Foreign Application Priority Data
Mar. 23, 2015 (JP) .................................. 2015-059343

(51) Int. Cl.
*H04W 52/02* (2009.01)
*H04W 4/70* (2018.01)
*H04W 4/38* (2018.01)

(52) U.S. Cl.
CPC ......... *H04W 52/0209* (2013.01); *H04W 4/38* (2018.02); *H04W 4/70* (2018.02);
(Continued)

(58) Field of Classification Search
CPC ..... H04W 4/38; H04W 4/70; H04W 52/0209; H04W 52/0216; H04W 52/0229; Y02D 70/00; Y02D 70/24; Y02D 70/25
See application file for complete search history.

(56) References Cited

U.S. PATENT DOCUMENTS

| | | | |
|---|---|---|---|
| 2013/0039317 A1* | 2/2013 | Jamadagni | H04W 4/70 370/329 |
| 2013/0107750 A1* | 5/2013 | Tiberi | G06F 1/3209 370/252 |

FOREIGN PATENT DOCUMENTS

| | | |
|---|---|---|
| JP | 04200032 A | 7/1992 |
| JP | 2006033674 A | 2/2006 |

(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.4.0, Dec. 2014, 60 pages.

(Continued)

*Primary Examiner* — Kan Yuen
(74) *Attorney, Agent, or Firm* — Sughrue Mion, PLLC (57) ABSTRACT

The present invention has been made in view of the aforementioned problem and aims to provide a technique for reducing consumption of transmission power of an MTC device. The present invention relates to a communication terminal including measurement means for measuring a measurement target, reception means for receiving a certain condition regarding transmission from an application server, and determination means for determining, when the result- (Continued)

ing measurement value satisfies the condition, that the measurement value should not be transmitted to the application server.

5 Claims, 6 Drawing Sheets

(52) U.S. Cl.
 CPC ... *H04W 52/0216* (2013.01); *H04W 52/0229* (2013.01); *Y02D 70/00* (2018.01); *Y02D 70/1262* (2018.01); *Y02D 70/21* (2018.01); *Y02D 70/24* (2018.01); *Y02D 70/25* (2018.01)

(56) References Cited

FOREIGN PATENT DOCUMENTS

| | | |
|---|---|---|
| JP | 2007-243478 A | 9/2007 |
| JP | 2010-206596 A | 9/2010 |
| JP | 2013-152659 A | 8/2013 |
| JP | 2014-526204 A | 10/2014 |
| WO | 2011121921 A1 | 10/2011 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS36.300 V12.4.0, Dec. 2014, 251 Pages.

International Search Report for PCT/JP2016/058791, dated May 17, 2016.

Communication dated Jul. 3, 2018, from the Japanese Patent Office in counterpart application No. 2017-508332.

* cited by examiner

COMMUNICATION TERMINAL, COMMUNICATION SYSTEM, COMMUNICATION METHOD, AND COMMUNICATION PROGRAM

CROSS REFERENCE TO RELATED APPLICATIONS

This application is a National Stage of International Application No. PCT/JP2016/058791 filed Mar. 18, 2016, claiming priority based on Japanese Patent Application No. 2015-059343 filed Mar. 23, 2015, the contents of all of which are incorporated herein by reference in their entirety.

TECHNICAL FIELD

The present disclosure relates to a communication terminal, a communication system, a communication method, and a communication program.

BACKGROUND ART

In 3GPP Long Term Evolution (LTE), which is one of next-generation cellular systems, Machine Type Communication (MTC) of Machine to Machine (M2M) communication is defined. In the MTC, an MTC device transmits and receives data. In 3GPP LTE, a discussion for reducing power consumption in the MTC device is currently being conducted.

In 3GPP LTE, in order to reduce power consumption in the MTC device, discontinuous reception (DRX) is defined in Non-Patent Literature 1. On the other hand, regarding discontinuous transmission (DTX), Non-Patent Literature 2 defines only discontinuous transmission of audio data.

CITATION LIST

Non-Patent Literature

[Non-Patent Literature 1] 3GPP TS36.321 (Internet <URL> HTTP://www.3gpp.org/dynareport/36-series.htm)
[Non-Patent Literature 2] 3GPP TS36.300 (Internet <URL> HTTP://www.3gpp.org/DynaReport/36-series.htm)

SUMMARY OF INVENTION

Technical Problem

When the MTC device transmits data, transmission power is larger than reception power and sleep power. Therefore, in the MTC device that is operated by batteries, consumption of transmission power at a time of transmission causes a problem.

The present invention has been made in view of the aforementioned problem and aims to provide a technique of reducing consumption of transmission power of the MTC device.

Solution to Problem

One aspect of the present invention is a communication terminal including: measurement means for measuring a measurement target; reception means for receiving a certain condition regarding transmission from an application server; and determination means for determining, when the resulting measurement value satisfies the condition, that the measurement value should not be transmitted to the application server.

One aspect of the present invention is a communication system including an application server and a terminal configured to communicate with the application server, in which the application server includes configuration means for configuring a certain condition regarding transmission, and the terminal includes: measurement means for measuring a measurement target; and determination means for determining, when the measurement value satisfies the configured condition, that the measurement value should not be transmitted to the application server.

One aspect of the present invention is a communication method including: measuring a measurement target; receiving a certain condition regarding transmission from an application server; and determining, when the resulting measurement value satisfies the condition, that the measurement value should not be transmitted to the application server.

One aspect of the present invention is a program of a communication terminal, the program causing the communication terminal to perform the following processing of: measuring a measurement target; receiving a certain condition regarding transmission from an application server; and determining, when the resulting measurement value satisfies the condition, that the measurement value should not be transmitted to the application server.

Advantageous Effects of Invention

According to the present invention, it is possible to reduce consumption of transmission power of the MTC device.

DESCRIPTION OF EMBODIMENTS

Figure 1:
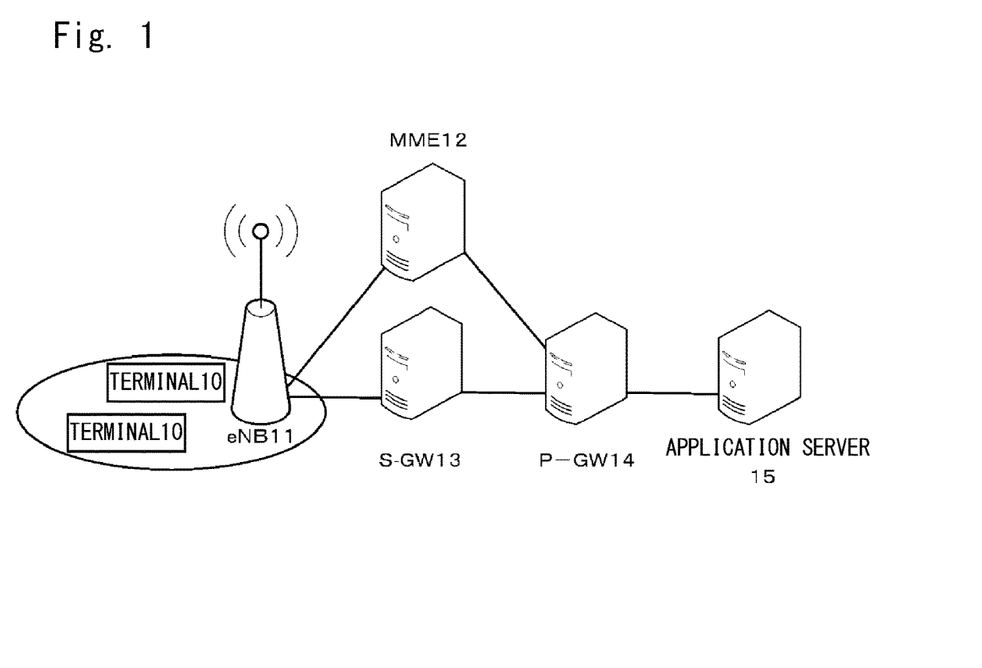
FIG. 1 is a schematic view of a communication system.

In the following description, with reference to the drawings, the features of the present disclosure will be described in detail. FIG. 1 is a schematic view of a communication system according to the present invention.

As shown in FIG. 1, a communication system 1 includes a terminal 10, an evolved NodeB (eNB) 11, a Mobility Management Entity (MME) 12, a Serving Gate Way (S-GW) 13, a Packetdata Network Gate Way (P-GW) 14, and an application server 15.

The present invention is characterized in that prediction range values regarding a prediction range, the prediction range values transmitted from the application server 15 is compared with a measurement value of a measurement target measured by the terminal 10 and the measurement value is not transmitted to the application server 15 when the measurement value is within the prediction range.

Further, the terminal includes deriving means for deriving, based on the measurement value that the measurement means has measured in the past, a prediction expression for calculating a prediction value and transmitting the derived prediction expression to the application server.

Further, the prediction value is calculated using the measurement value that the measurement means has measured in the past and the prediction expression derived by the deriving means.

Further, the prediction value is calculated using the prediction expression derived by the deriving means and the measurement value measured by the measurement means of a communication terminal located in a vicinity of the communication terminal that has transmitted the prediction expression.

Further, the prediction value is calculated using at least one of the past measurement value measured by the measurement means and the past prediction value.

Further, the communication terminal is an MTC device.

According to the aforementioned features, the present invention is able to reduce consumption of transmission power of the MTC device.

In the following description, embodiments of the present invention will be described.

First Embodiment

The terminal 10 is a terminal used for MTC and is also called an MTC device. The terminal 10 executes location registration in the MME 12 and the S-GW 13 via the eNB 11, which is a radio base station, and communicates with the application server 15 via the P-GW 14.

Figure 2:
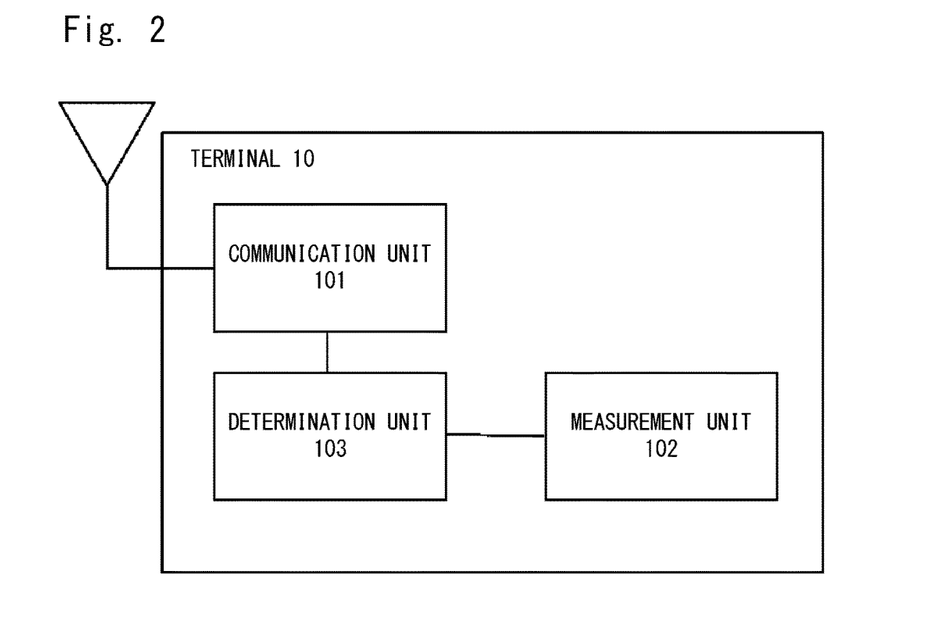
FIG. 2 is a block diagram of a terminal according to a first embodiment.

FIG. 2 is a block diagram of the terminal 10 according to the first embodiment. The terminal 10 includes, as shown in FIG. 2, a communication unit 101, a measurement unit 102, and a determination unit 103.

The communication unit 101 performs discontinuous transmission and reception of DRX and DTX with the application server 15. The communication unit 101 receives, at the time of DRX from the application server 15, the prediction range values regarding the prediction range, the prediction range values including the prediction value of the measurement value measured by the measurement unit 102 and tolerance range values regarding a tolerance range roughly around this prediction value. Further, the communication unit 101 performs or does not perform transmission by DTX depending on the result of the determination in the determination unit 102.

The measurement unit 102 measures the measurement target and accumulates the results of the measurement. The measurement target indicates a physical amount, which is a physical phenomenon such as mass, distance, magnitude of a force, temperature, humidity, atmospheric pressure, pressure, speed, acceleration, volume, or luminance that can be measured by a measurement device. Further, a physical amount such as density that can be calculated from the measurement value is also accumulated as the measurement value. Note that the types of the physical amounts measured by the measurement unit 102 are determined in advance for each application. Further, the measurement in the measurement unit 102 may be performed at regular intervals or in accordance with an instruction from the application server 15. When the measurement is performed in accordance with the instruction from the application server 15, the measurement is preferably performed after a certain number of measurement values are accumulated in the application server 15.

The determination unit 103 compares the prediction range values regarding the prediction range that the communication unit 101 has received from the application server 15 with the measurement value measured by the measurement unit 102. When the result of the comparison indicates that the measurement value is within the prediction range, the determination unit 103 determines that it should not perform DTX. On the other hand, when the result of the comparison indicates that the measurement value is outside the prediction range, the determination unit 103 determines that it should perform DTX and transmit the measurement value to the application server 15.

Figure 3:
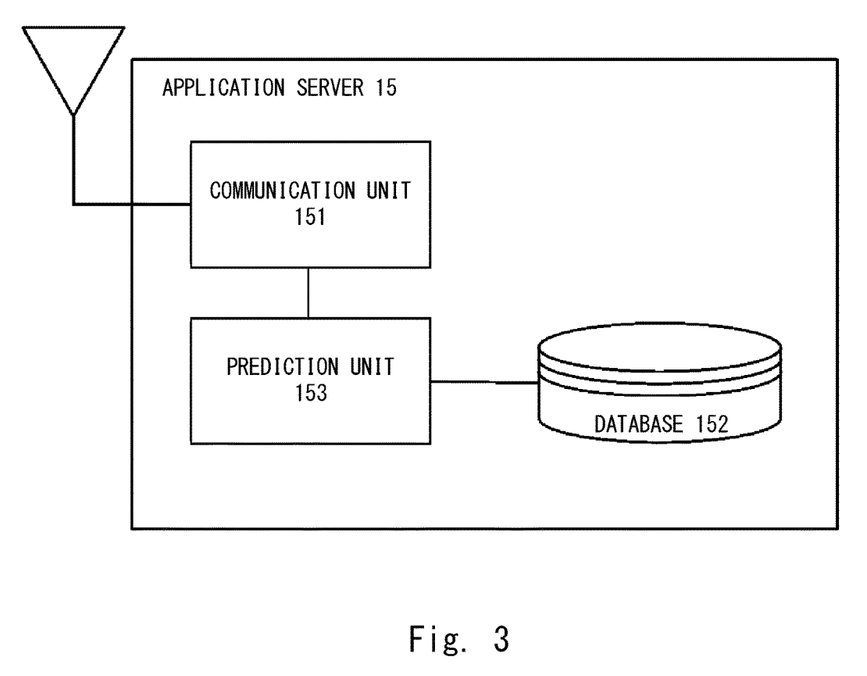
FIG. 3 is a block diagram of an application server according to the first embodiment.

The application server 15 is a server that can communicate with a plurality of terminals 10. The application server 15 includes, as shown in FIG. 3, a communication unit 151, a database 152, and a prediction unit 153.

The communication unit 151 receives the measurement value transmitted from the terminal 10. Further, the communication unit 151 transmits the prediction range values regarding the prediction range determined based on the prediction value predicted by the prediction unit 153 to the terminal 10.

The database 152 accumulates the measurement values transmitted from the terminal 10 in time series.

The prediction unit 153 calculates the prediction value based on the measurement values accumulated in the database 152 and determines the prediction range values obtained by adding the predetermined tolerance range values to this prediction value. While the prediction unit 153 performs a prediction using the past measurement values accumulated in the database 152, a method of performing a prediction using the measurement value that has been measured most recently, a method of performing a prediction using a measurement value measured at the same time in a predetermined period, or a method of performing a prediction using measurement values of a plurality of given dates may be used. Further, the prediction unit 153 causes the database 152 to store the prediction value as the measurement value when the measurement value is not transmitted from the terminal 10 for a predetermined period of time after the transmission of the prediction range values.

Figure 4:
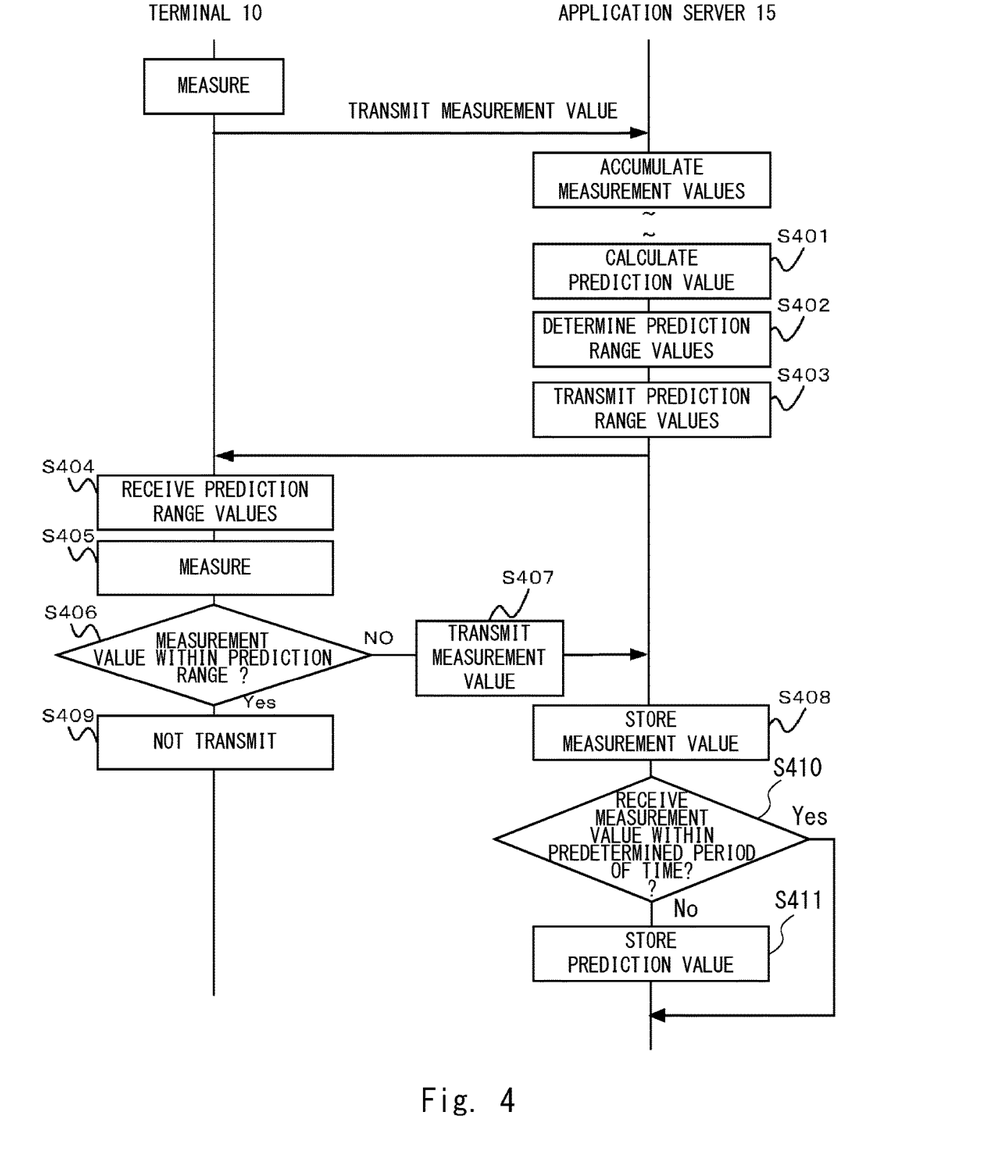
FIG. 4 is a timechart for describing an operation according to the first embodiment.

Next, an operation according to this embodiment will be described. FIG. 4 is a timechart for describing the operation according to this embodiment. It is assumed that the application server 15 has already accumulated the measurement values obtained by measuring, by the measurement unit 102 of the terminal 10, the physical amount determined for each application and the measurement unit 102 performs a measurement when the prediction range values is transmitted from the application server.

The prediction unit 153 calculates the prediction value based on the measurement values accumulated in the database 152 (S401) and determines the prediction range values obtained by adding the tolerance range values to the prediction value (S402).

The communication unit 151 transmits the prediction range values determined by the prediction unit 153 to the terminal 10 (S403).

The communication unit 101 of the terminal 10 receives the prediction range values transmitted from the application server 15 at the timing of DRX (S404).

The measurement unit 102 starts a measurement (S405) and the determination unit 103 compares the resulting measurement value with the received prediction range values (S406). When the measurement value is outside the prediction range, the determination unit 103 determines that it should transmit the measurement value, then it transmits the measurement value via the communication unit 101 at the timing of DTX (S407), and the communication unit 151 of the application server 15 receives this measurement value to store this value in the database 152 (S408).

On the other hand, when the measurement value is within the prediction range, the determination unit 103 determines that it should not transmit the measurement value (S409).

The prediction unit 153 monitors, after it has transmitted the prediction range values, whether the measurement value has been transmitted from the terminal 10 within the predetermined period of time (S410). When the measurement value has not been transmitted within this period of time, the prediction unit 153 causes the database 152 to store the prediction value as the measurement value (S411).

According to this embodiment, the measurement value is transmitted when it is outside the range of prediction values, whereby it is possible to achieve consumption of transmission power of the terminal 10.

Some other methods may be employed as the prediction method performed by the prediction unit 153 described above.

For example, a method of performing a prediction using a measurement value of the same application previously transmitted from a neighboring terminal 10 which is in the vicinity of the terminal 10 to which the prediction range values is transmitted may be used. In this case, similar to the above description, a method of accumulating the measurement values in time series and performing a prediction using the measurement value that has been measured most recently, a method of performing a prediction using data measured at the same time in a predetermined period, and a method of performing a prediction using a measurement value on a given date may be used. Both the measurement value that has been previously transmitted from the neighboring terminal 10 and the measurement value that has been previously transmitted from the terminal 10 to which the prediction range values is transmitted may be used.

Next, when a plurality of applications are being executed in the terminal 10 to which the application server 15 transmits the prediction range values, a method of predicting the prediction value of the measurement value of the target using the measurement data in another application may be used. One example of this case includes, for example, a case in which the current temperature is predicted from the sales amount of cold drinks in a vending machine.

Next, a method of performing a prediction using a measurement value of an external database that can be accessed by the application server 15 may be used. One example of this case includes a case in which the temperature of a farm located in a specific region where the terminal is installed is predicted using the temperature of this specific region announced by the Meteorological Agency.

The prediction method in the present invention may be any one of the aforementioned methods or may be a combination thereof.

Second Embodiment

A second embodiment according to the present invention will be described. In the aforementioned embodiment, the example in which the application server 15 determines the prediction range values using the past measurement value has been described. In this embodiment, an example in which the terminal 10 derives a prediction expression using a past measurement value and the application server 15 determines the prediction range values using the prediction expression and the measurement value will be described. Elements of this embodiment which are the same as those of the aforementioned embodiment are denoted by the same reference numbers as those of the aforementioned embodiment and the descriptions thereof will be omitted.

Figure 5:
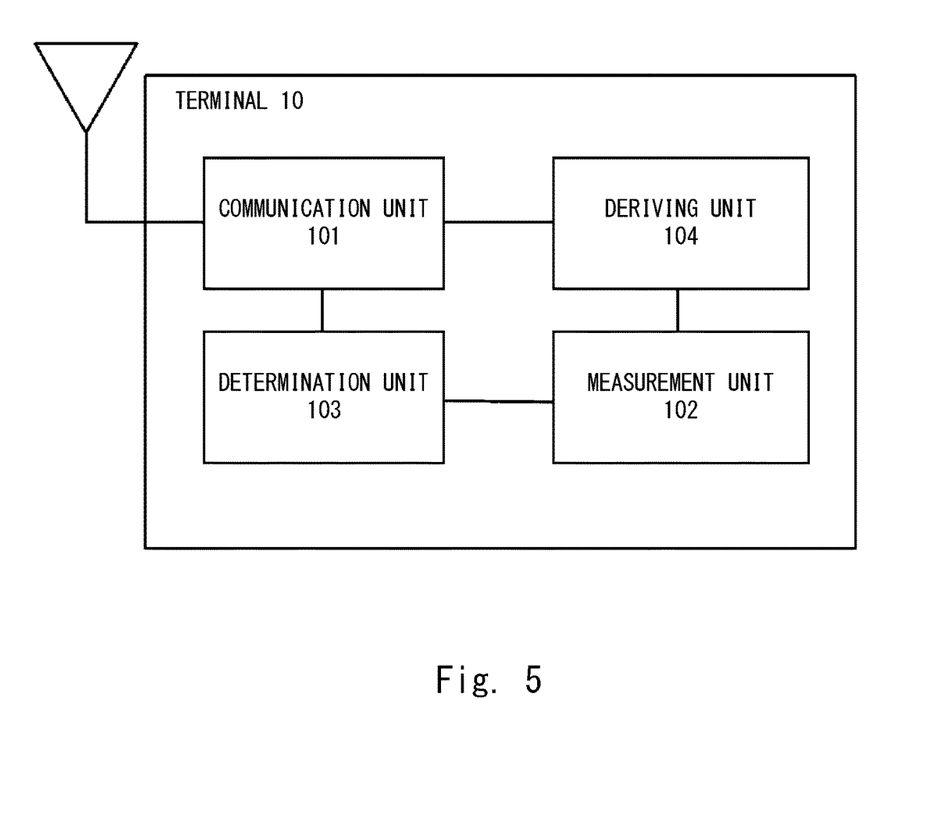
FIG. 5 is a block diagram of a terminal according to a second embodiment.

The terminal 10 includes, besides the components of the first embodiment, a deriving unit 104, as shown in FIG. 5.

The deriving unit 104 performs regression analysis using the measurement values measured and accumulated by the measurement unit 102 to derive the prediction expression. Then the deriving unit 104 transmits the derived prediction expression to the application server 15 via the communication unit 101 at the timing of DTX. The prediction expression may be derived when, for example, a predetermined number of measurement values have been collected, it may be derived at regular intervals, or it may be derived when the instruction from the application server 15 is received. Further, the prediction expression may be transmitted every time the prediction expression is derived, at regular intervals, or in accordance with an instruction from the application server 15.

The prediction unit 153 of the application server 15 calculates the prediction value using the prediction expression transmitted from the terminal 10 and the measurement values accumulated in the database 152 to determine the prediction range values.

Figure 6:
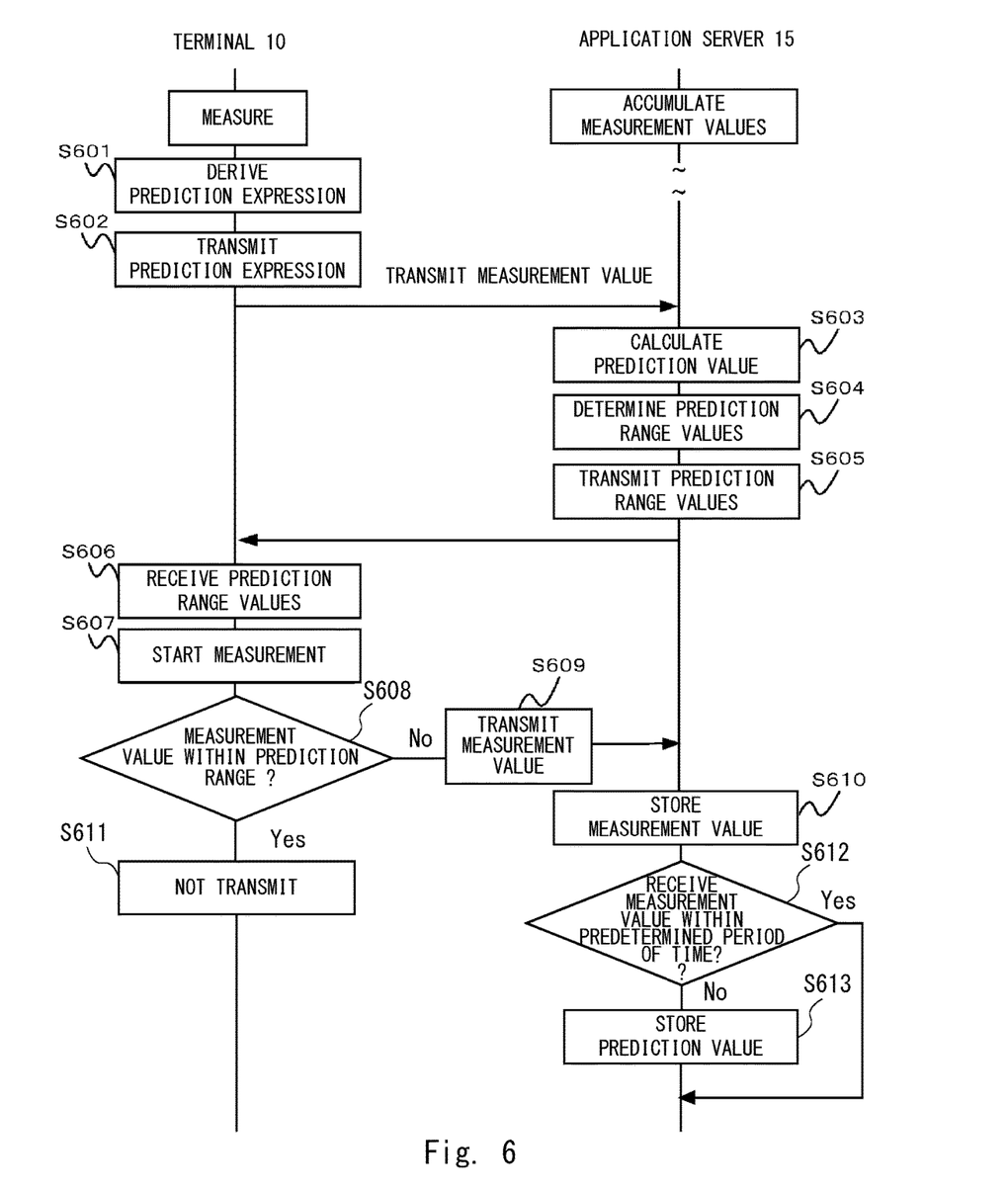
FIG. 6 is a timechart for describing an operation according to the second embodiment.

Next, an operation of this embodiment will be described. FIG. 6 is a timechart for describing the operation according to this embodiment. It is assumed that the application server 15 has already accumulated the measurement values obtained by measuring, by the measurement unit 102 of the terminal 10, the physical amount determined for each application.

The deriving unit 104 derives the prediction expression using the measurement value that has been measured in the past (S601). Then the deriving unit 104 transmits the derived prediction expression to the application server 15 via the communication unit 101 at the timing of DTX (S602).

The prediction unit 153 receives the prediction expression that has been transmitted, calculates the prediction value based on the received prediction expression and the measurement values accumulated in the database 152 (S603), and determines the prediction range values obtained by adding the tolerance range values to the prediction value (S604).

The communication unit 151 transmits the prediction range values determined by the prediction unit 153 to the terminal 10 (S605).

The communication unit 101 of the terminal 10 receives the prediction range values transmitted from the application server 15 at the timing of DRX (S606).

Upon receiving the prediction range values, the measurement unit 102 starts a measurement (S607) and the determination unit 103 compares the resulting measurement value with the received prediction range values (S608). When the measurement value is outside the prediction range, the determination unit 103 determines that it should transmit the measurement value, then it transmits the measurement value via the communication unit 101 at the timing of DTX (S609), the communication unit 151 of the application server 15 receives the measurement value to store this value in the database 152 (S610).

On the other hand, when the measurement value is within the prediction range, the determination unit 103 determines that it should not transmit the measurement value (S611).

The prediction unit 153 monitors, after it has transmitted the prediction range values, whether the measurement value has been transmitted from the terminal 10 within the predetermined period of time (S612). When the measurement value has not been transmitted, the prediction unit 153 causes the database 152 to store the prediction value as the measurement value (S613).

According to this embodiment, the measurement value is transmitted when it is outside the prediction range, whereby it is possible to reduce consumption of transmission power of the terminal 10.

Some other methods may be employed as the prediction method performed by the prediction unit 153 described above.

For example, a method of performing a prediction using a prediction expression and a measurement value of the same application transmitted from the neighboring terminal 10 which is in the vicinity of the terminal 10 to which the prediction range values is transmitted may be used. In this case, similar to the above description, a method of accumulating the measurement values in time series and performing a prediction using the measurement value that has been measured most recently, a method of performing a prediction using data measured at the same time in a predetermined period, and a method of performing a prediction using a measurement value on a given date may be used. The measurement expression transmitted from the neighboring terminal 10 and the measurement value that has been previously transmitted from the terminal 10 to which the prediction range values is transmitted may be used. Alternatively, the measurement expression transmitted from the terminal 10 to which the prediction range values is transmitted and the measurement value that has been previously transmitted from the neighboring terminal 10 may be used.

Further, the method of deriving the prediction expression in the deriving unit 104 described above may be a method other than the aforementioned methods. When, for example, a plurality of applications are being executed in the terminal 10, a method of deriving the prediction expression by performing correlation analysis with measurement data in another application may be used.

The prediction method and the deriving method according to the present disclosure may be any one of the aforementioned ones or may be a combination thereof.

While the present invention described above can be formed of hardware as will be clear from the aforementioned description, it can be achieved by causing an information processing apparatus (CPU) to execute the processing using a computer program. In this case, functions and operations similar to those in the aforementioned embodiments can be achieved by a processor operated by the program stored in a program memory.

Figure 7:
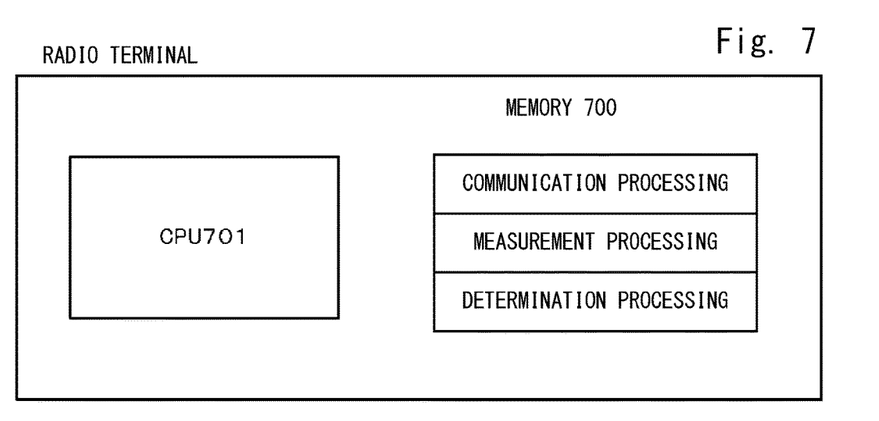
FIG. 7 is a diagram showing another aspect of a radio terminal 1 in a radio communication system according to the first embodiment.

For example, the radio terminal 1 can be achieved by a computer system including a memory 700 and a CPU 701 as shown in FIG. 7. In this case, the memory 700 stores a program for performing processing corresponding to the communication unit 101, the measurement unit 102, and the determination unit 103 according to the aforementioned first embodiment. The CPU 701 executes the program stored in the memory 700, to thereby achieve the functions of the communication unit 101, the measurement unit 102, and the determination unit 103.

Figure 8:
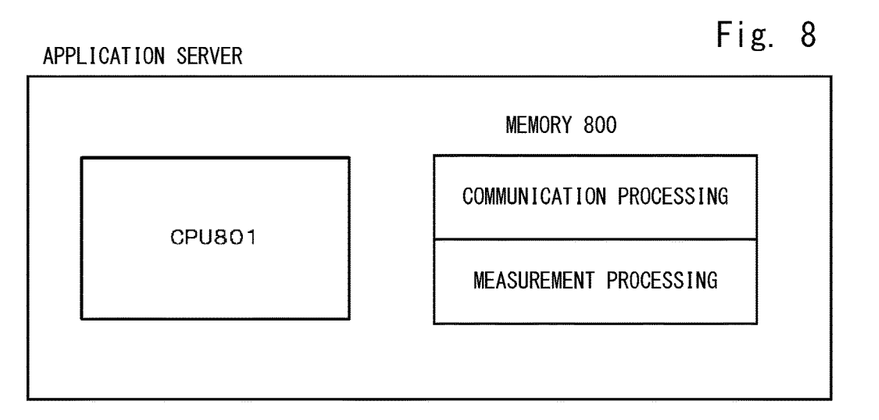
FIG. 8 is a diagram showing another aspect of a base station and a radio network in the radio communication system according to this embodiment.

Further, the application server 15 that includes the communication unit 151 and the prediction unit 153 can be similarly achieved by a computer system including a memory 800 and a CPU 801 as shown in FIG. 8. In this case, the memory 800 stores a program for performing processing corresponding to the communication unit 151 and the prediction unit 153 stated above. The CPU 801 executes the program stored in the memory 800, to thereby achieve the functions of the communication unit 151 and the prediction unit 153. The database 152 may be stored in the memory 800, may be stored in another memory in the same computer system, or may be stored in a memory in another computer system.

Figure 9:
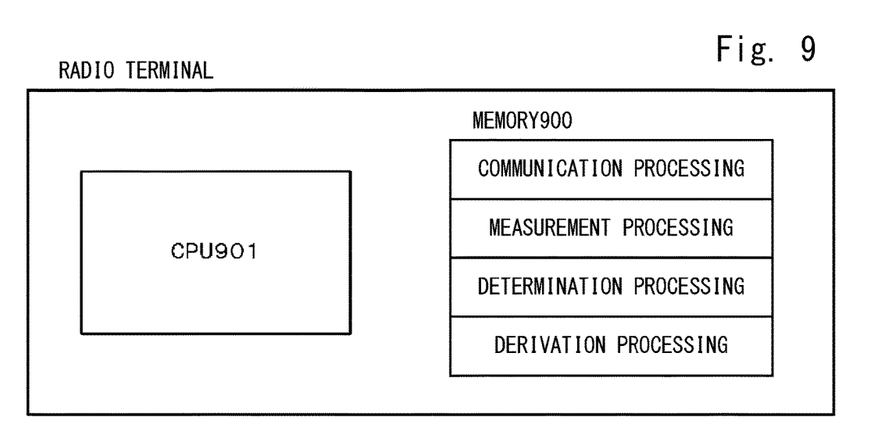
FIG. 9 is a diagram showing another aspect of a radio terminal 1 in a radio communication system according to the second embodiment.

Further, the radio terminal 1 can be achieved by a computer system including a memory 900 and a CPU 901 as shown in FIG. 9. In this case, the memory 900 stores a program for performing processing corresponding to the communication unit 101, the measurement unit 102, the determination unit 103, and the deriving unit 104 according to the aforementioned second embodiment. Then the CPU 901 executes the program stored in the memory 900, to thereby achieve the functions of the communication unit 101, the measurement unit 102, the determination unit 103, and the deriving unit 104.

Further, while some or all of the aforementioned embodiments may be described as shown in the following Supplementary Notes, they are not limited to them.

[Supplementary Note 1]

A communication terminal comprising:
measurement means for measuring a measurement target;
reception means for receiving a certain condition regarding transmission from an application server; and
determination means for determining, when the resulting measurement value satisfies the condition, that the measurement value should not be transmitted to the application server.

[Supplementary Note 2]

The communication terminal according to Supplementary Note 1, wherein the condition is that the measurement value measured by the measurement means is a value within a prediction range obtained from a prediction value of the measurement value measured by the measurement means.

[Supplementary Note 3]

The communication terminal according to Supplementary Note 1 or 2, comprising deriving means for deriving, based on the measurement value that the measurement means has measured in the past, a prediction expression for calculating the prediction value and transmitting the derived prediction expression to the application server.

[Supplementary Note 4]

The communication terminal according to Supplementary Note 3, wherein the prediction value is calculated using the measurement value that the measurement means has measured in the past and the prediction expression.

[Supplementary Note 5]

The communication terminal according to Supplementary Note 3, wherein the prediction value is calculated using the prediction expression and the measurement value measured by the measurement means of a communication terminal located in a vicinity of the communication terminal that has transmitted the prediction expression.

[Supplementary Note 6]

The communication terminal according to any one of Supplementary Notes 2 to 5, wherein the prediction value is calculated using at least one of the past measurement value measured by the measurement means and the past prediction value.

[Supplementary Note 7]

The communication terminal according to any one of Supplementary Notes 1 to 6, wherein the communication terminal is an MTC device.

[Supplementary Note 8]

A communication system comprising an application server and a terminal configured to communicate with the application server, wherein the application server comprises configuration means for configuring a certain condition regarding transmission, and the terminal comprises:

measurement means for measuring a measurement target; and determination means for determining, when the measurement value satisfies the configured condition, that the measurement value should not be transmitted to the application server.

[Supplementary Note 9]

The communication system according to Supplementary Note 8, wherein the condition is that the measurement value measured by the measurement means is a value within a prediction range obtained from a prediction value of the measurement value measured by the measurement means.

[Supplementary Note 10]

The communication system according to Supplementary Note 8 or 9, wherein the terminal comprises deriving means for deriving, based on the measurement value that the measurement means has measured in the past, a prediction expression for calculating the prediction value.

[Supplementary Note 11]

The communication system according to Supplementary Note 10, wherein the configuration means calculates the prediction value using the measurement value that the measurement means has measured in the past and the prediction expression derived by the deriving means.

[Supplementary Note 12]

The communication system according to Supplementary Note 10, wherein the configuration means calculates a prediction value using the derived prediction expression and the measurement value measured by the measurement means of a communication terminal located in a vicinity of the communication terminal that has derived the prediction expression.

[Supplementary Note 13]

The communication system according to any one of Supplementary Notes 9 to 12, wherein the configuration means calculates the prediction value using at least one of the past measurement value measured by the measurement means and the past prediction value.

[Supplementary Note 14]

The communication system according to any one of Supplementary Notes 8 to 13, wherein the communication terminal is an MTC device.

[Supplementary Note 15]

A communication method comprising:

measuring a measurement target;

receiving a certain condition regarding transmission from an application server; and determining, when the resulting measurement value satisfies the condition, that the measurement value should not be transmitted to the application server.

[Supplementary Note 16]

A communication terminal, wherein the communication terminal including a memory and a processor, and the processor executes the following processing of:

measuring a measurement target;

receiving a certain condition regarding transmission from an application server; and determining, when the resulting measurement value satisfies the condition, that the measurement value should not be transmitted to the application server.

While the present invention has been described above with reference to the embodiments and examples, the present invention is not necessarily limited to the aforementioned embodiments and examples and may be modified in various manners within the technical scope of the present invention.

REFERENCE SIGNS LIST

1 COMMUNICATION SYSTEM
10 TERMINAL
11 eNB
12 MME
13 S-GW
14 P-GW
15 APPLICATION SERVER
101 COMMUNICATION UNIT
102 MEASUREMENT UNIT
103 DETERMINATION UNIT
104 DERIVING UNIT
151 COMMUNICATION UNIT
152 DATABASE
153 PREDICTION UNIT
700 MEMORY
701 CPU
800 MEMORY
801 CPU
900 MEMORY
901 CPU

The invention claimed is:

1. A communication system comprising an application server and a terminal configured to communicate with the application server, wherein the terminal comprises:

a first hardware, including a first processor and a first memory;

a measurement unit that is implemented at least by the first hardware and that measures a measurement target;

a deriving unit that is implemented at least by the first hardware and that derives, based on first measurement values measured by the measurement unit in the past, a prediction expression for calculating a prediction value of a measurement value measured by the measurement unit and transmits the derived prediction expression to the application server;

a determination unit that is implemented at least by the first hardware and that determines, when a second measurement value measured by the measurement unit satisfies a condition configured by the application server, that the second measurement value should not be transmitted to the application server; and the application server comprises:

a second hardware, including a second processor and a second memory; and a configuration unit that is implemented at least by the second hardware and that calculates, based on the prediction expression transmitted by the terminal and a third measurement value measured and transmitted by the measurement unit, a prediction value, and determines, based on the calculated prediction value, a prediction range, and configures the condition to the terminal, the condition being based on the prediction range.

2. The communication system according to claim 1, wherein the condition is that the second measurement value measured by the measurement unit is a value within the prediction range.

3. The communication system according to claim 1, wherein the communication terminal is a Machine Type Communication (MTC) device.

4. A communication method in a communication system including an application server and a terminal, the communication method comprising:

measuring, at the terminal, a measurement target;

deriving at the terminal, based on first measurement values measured in the past, a prediction expression for calculating a prediction value of a measurement value measured by a measurement unit and transmitting the derived prediction expression to the application server;

determining at the terminal, when a second measurement value satisfies a configured condition configured by the application server, that the second measurement value should not be transmitted to the application server; and calculating at the application server, based on the prediction expression transmitted by the terminal and a third measurement value measured and transmitted by the terminal, a prediction value, and determining, based on the calculated prediction value, a prediction range, and configuring the condition to the terminal, the condition being based on the prediction range.

5. The communication system according to claim 1, wherein the communication terminal does not transmit the second measurement value to the application server when the determination unit determines that the second measurement satisfies the condition configured by the application server.

* * * * *